United States Patent

(12) United States Patent
Chan et al.

(10) Patent No.: US 7,618,249 B2
(45) Date of Patent: Nov. 17, 2009

(54) MEMORY CARD MOLDING APPARATUS AND PROCESS

(75) Inventors: Lap Yu Chan, Singapore (SG); Chun Yu Li, Singapore (SG); Si Liang Lu, Singapore (SG); Teng Hock Eric Kuah, Singapore (SG)

(73) Assignee: ASM Technology Singapore Pte Ltd., Singapore (SG)

( * ) Notice: Subject to any disclaimer, the term of this patent is extended or adjusted under 35 U.S.C. 154(b) by 31 days.

(21) Appl. No.: 11/534,254

(22) Filed: Sep. 22, 2006

(65) Prior Publication Data
US 2008/0075802 A1 Mar. 27, 2008

(51) Int. Cl.
*B29C 45/14* (2006.01)

(52) U.S. Cl. ................. 425/116; 425/117; 425/121; 425/127; 425/129.1

(58) Field of Classification Search ........... 425/116, 425/117, 129.1, 121, 127, 812, DIG. 47
See application file for complete search history.

(56) References Cited

U.S. PATENT DOCUMENTS

| | | | | |
|---|---|---|---|---|
| 3,659,821 A * | 5/1972 | Sakamoto et al. | ............. | 249/84 |
| 3,972,663 A * | 8/1976 | Taniguchi | ............. | 425/125 |
| 4,332,537 A * | 6/1982 | Slepcevic | ............. | 425/121 |
| 4,877,387 A * | 10/1989 | Fierkens et al. | ............. | 425/116 |
| 5,061,164 A * | 10/1991 | Sabado et al. | ............. | 425/116 |
| 5,484,274 A * | 1/1996 | Neu | ............. | 425/116 |
| 5,645,864 A * | 7/1997 | Higuchi | ............. | 425/116 |
| 5,766,535 A * | 6/1998 | Ong | ............. | 264/272.15 |
| 5,783,220 A * | 7/1998 | Osada et al. | ............. | 425/116 |
| 5,932,254 A * | 8/1999 | Mitchell et al. | ............. | 425/117 |
| 6,305,921 B1 * | 10/2001 | Grams et al. | ............. | 425/116 |
| 6,315,540 B1 * | 11/2001 | Tsuruta | ............. | 425/123 |
| 6,422,851 B2 * | 7/2002 | Kang | ............. | 425/116 |
| 6,495,083 B2 * | 12/2002 | Weber | ............. | 264/272.15 |
| 6,616,436 B1 * | 9/2003 | Lee et al. | ............. | 425/116 |
| 6,626,656 B2 * | 9/2003 | Thummel | ............. | 425/116 |
| 6,674,165 B2 * | 1/2004 | Ho et al. | ............. | 257/730 |
| 6,776,599 B2 * | 8/2004 | Street et al. | ............. | 425/116 |
| 6,840,751 B2 * | 1/2005 | Matsunami | ............. | 425/129.1 |
| 6,857,865 B2 * | 2/2005 | Tsai et al. | ............. | 425/116 |
| 6,893,244 B2 * | 5/2005 | Thummel | ............. | 425/116 |
| 6,908,293 B2 * | 6/2005 | Furuta et al. | ............. | 425/116 |
| 7,153,116 B2 * | 12/2006 | Tofukuji et al. | ............. | 425/89 |
| 7,169,345 B2 * | 1/2007 | Murugan | ............. | 264/272.15 |
| 7,247,267 B2 * | 7/2007 | Kao et al. | ............. | 264/272.17 |

(Continued)

*Primary Examiner*—Eric Hug
*Assistant Examiner*—Seyed Masoud Malekzadeh
(74) *Attorney, Agent, or Firm*—Ostrolenk Faber LLP

(57) ABSTRACT

A molding system for provided which is configured for molding a substrate comprising a plurality of individual carriers each of which is pre-cut into a shape of a memory card device and connected to a frame of the substrate by narrow tie bars. A molding plate is configured to receive the substrate, and a cavity plate configured to be clamped to the molding plate further comprises a plurality of molding cavities each constructed in the shape of the said carriers. The cavities are operative to create molded packages onto the carrier conforming to a shape of the memory card device without need for further forming of the molded compound after molding. Additionally, a nozzle on the surface of each cavity is operative to introduce molding material into the cavity in a direction that is substantially perpendicular to a plane of the substrate placed on the molding plate.

14 Claims, 8 Drawing Sheets

U.S. PATENT DOCUMENTS

| | | | |
|---|---|---|---|
| 7,265,453 B2 * | 9/2007 | James et al. | 257/787 |
| 7,326,041 B2 * | 2/2008 | Ochiai et al. | 425/116 |
| 2001/0013674 A1 * | 8/2001 | Shimizu et al. | 264/511 |
| 2001/0038166 A1 * | 11/2001 | Weber | 264/272.15 |
| 2002/0041911 A1 * | 4/2002 | Mine | 425/116 |
| 2002/0051832 A1 * | 5/2002 | Abela et al. | 425/129.1 |
| 2002/0142058 A1 * | 10/2002 | Tanaka et al. | 425/127 |
| 2003/0034555 A1 * | 2/2003 | Ho et al. | 257/711 |
| 2003/0235636 A1 * | 12/2003 | Tsai et al. | 425/116 |
| 2004/0033283 A1 * | 2/2004 | Thummel | 425/116 |
| 2004/0071805 A1 * | 4/2004 | Boyaud et al. | 425/116 |
| 2004/0075191 A1 * | 4/2004 | Prior et al. | 264/272.11 |
| 2004/0105909 A1 * | 6/2004 | Tofukuji et al. | 425/116 |
| 2004/0214371 A1 * | 10/2004 | Mahmood | 438/106 |
| 2005/0037104 A1 * | 2/2005 | Kao et al. | 425/116 |
| 2005/0089594 A1 * | 4/2005 | Wang et al. | 425/116 |
| 2005/0248041 A1 * | 11/2005 | Kuah et al. | 257/787 |
| 2006/0043640 A1 * | 3/2006 | Mahmood et al. | 264/272.17 |
| 2006/0105501 A1 * | 5/2006 | Kuah et al. | 438/123 |
| 2006/0175734 A1 * | 8/2006 | Chen et al. | 264/272.14 |
| 2006/0218777 A1 * | 10/2006 | Swift et al. | 29/605 |
| 2006/0279021 A1 * | 12/2006 | Shinma | 264/272.17 |
| 2007/0087067 A1 * | 4/2007 | Yuan et al. | 425/116 |

* cited by examiner

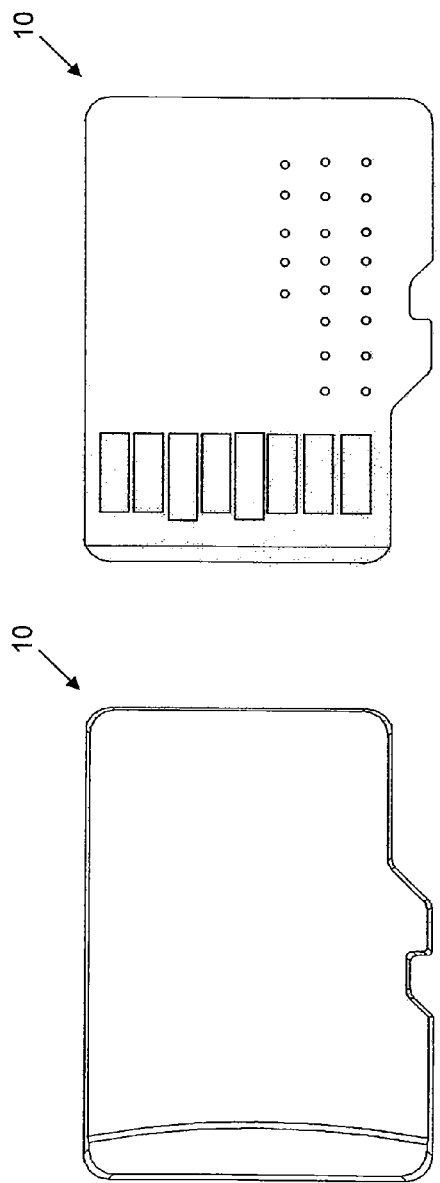
FIG. 1(a) (Prior Art)
FIG. 1(b) (Prior Art)
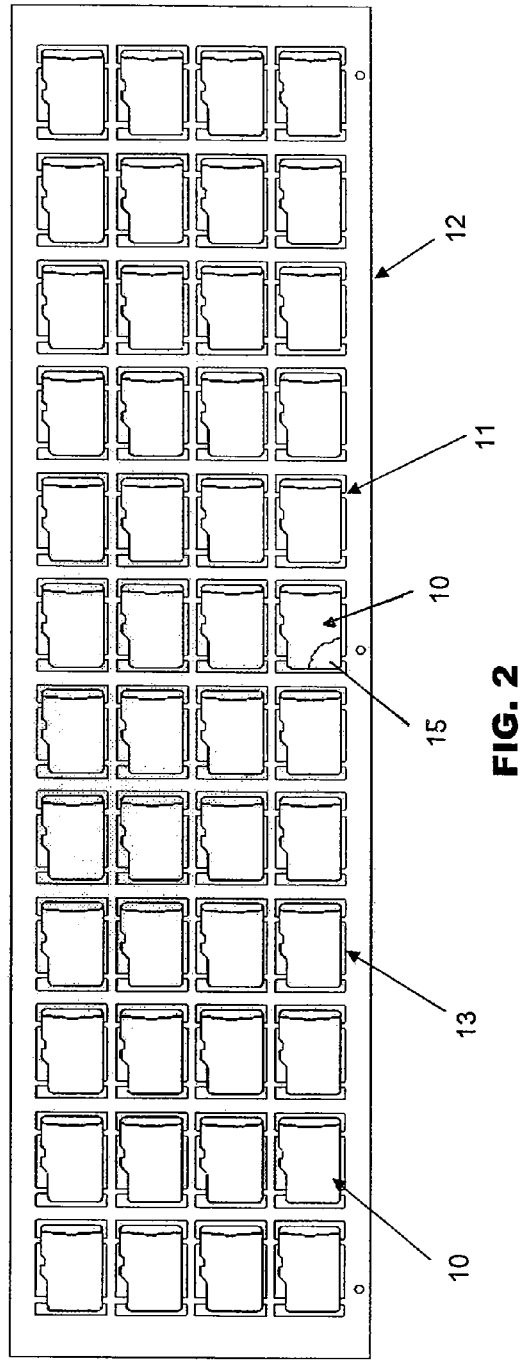
FIG. 2

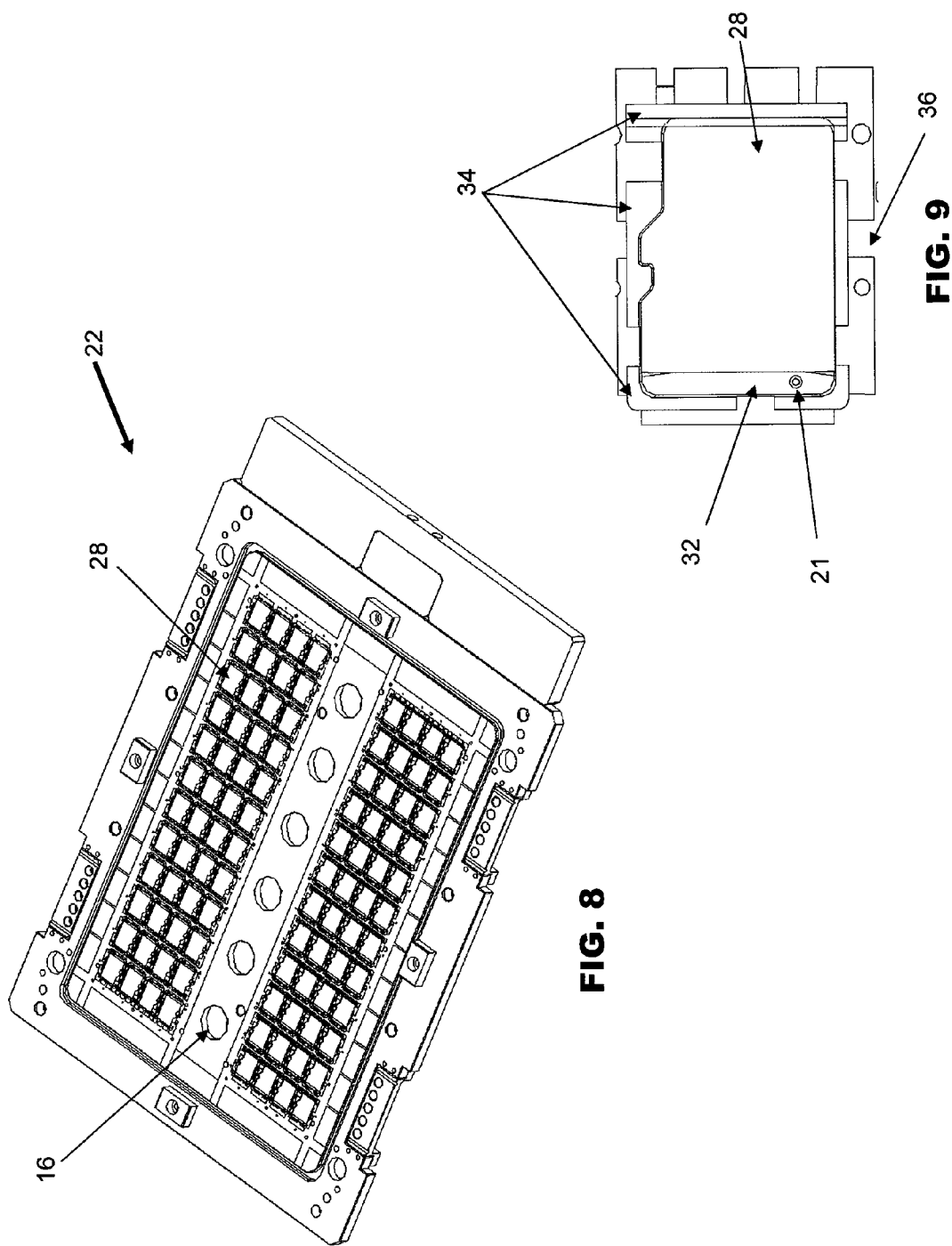

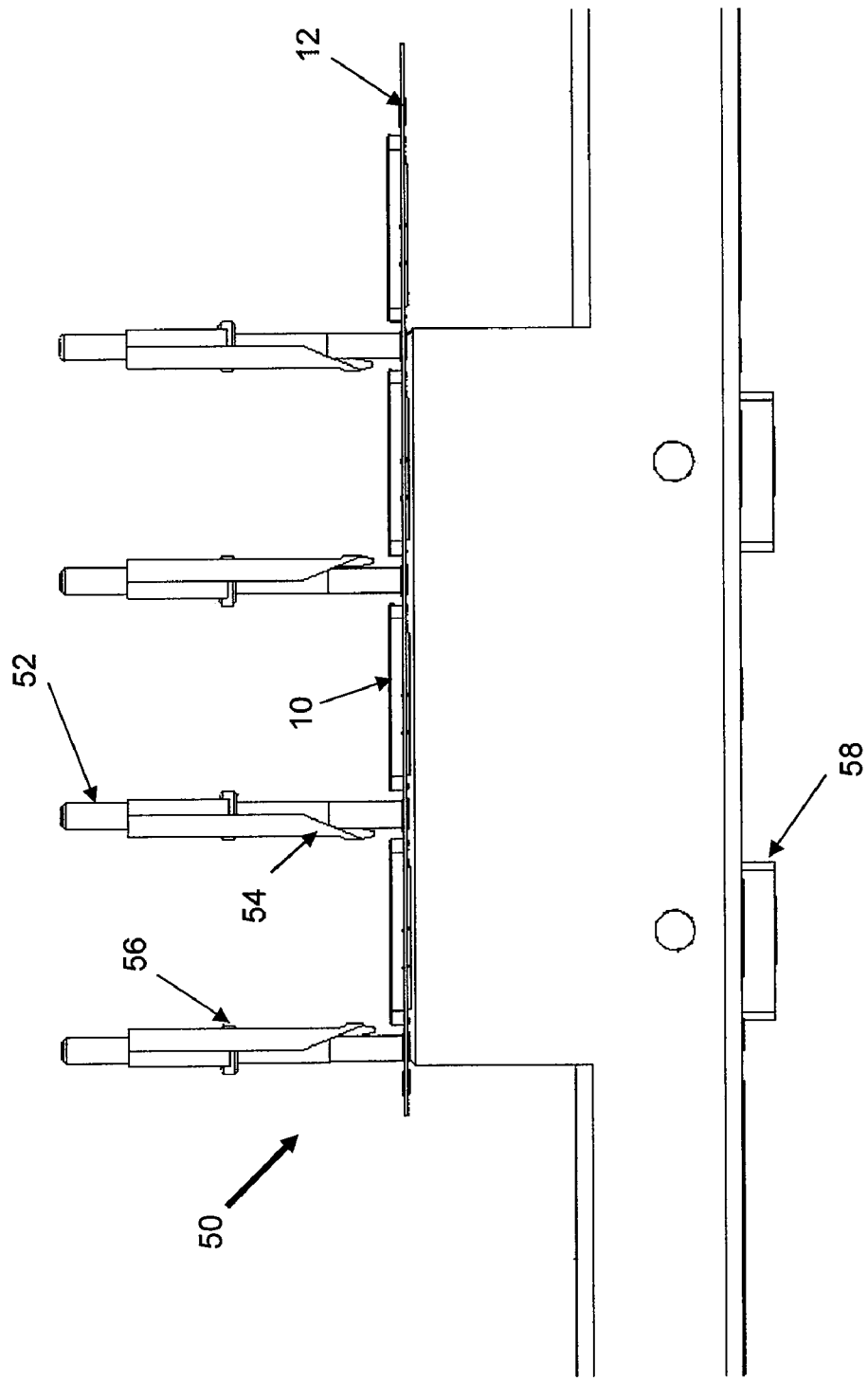

MEMORY CARD MOLDING APPARATUS AND PROCESS

FIELD OF THE INVENTION

The invention relates to the packaging of small electronic devices, and in particular to the packaging of flash memory cards.

BACKGROUND AND PRIOR ART

Portable integrated circuit cards, also referred to as flash memory cards, are popularly used with portable consumer devices such as digital cameras, celluar phones and audio players for the storage of data, such as images, music video and other information. Such cards usually contain a reprogrammable non-volatile semiconductor memory cell array along with a controller that controls operation of the memory cell array and interfaces with a host device to which the card is electrically connected. Such flash memory cards have been commercially implemented according to a number of well-known standards, such as Compact Flash (CF) cards, Multi-MediaCards (MMC), Secure Digital (SD) cards and Memory Sticks.

The advantage of these flash memory cards is that they store information without requiring a power source and are solid state devices with no moving parts. They are also compact in size. FIGS. 1(a) and 1(b) show front and back views respectively of an exemplary memory card in the form of a secure digital ("SD") memory card.

A conventional method of manufacturing memory cards is to first bond integrated circuit chips or dice onto substrates in an array form, then wire-bonding the dice to the substrates to electrically connect them. Thereafter, wire-bonded dice are molded to protect them from the environment. The molding is usually performed using block molding, wherein multiple dice are molded within a single stick or block, or in several islands, each molded portion comprising multiple dice.

Since multiple dice are molded together, each individual die comprised in a molded portion needs to be separated from the others by dicing or cutting through the molded material. Memory cards typically incorporate special shapes and features, such as chamfers to aid insertion to a host device during use. Special cutting techniques must be used to cut these shapes and features as the components are fragile and small in size. For example, abrasive water jet cutting is conventionally used to cut out irregular profiles from the molded block, then a saw is used to cut the remaining straight edges to singulate individual memory cards.

As memory cards are getting smaller, it is getting more difficult to maintain singulation quality. The process is also relatively slow. Furthermore, dicing requires further processing to wash and dry the individual memory cards to remove debris. Only then can inspection and final testing be performed. These processes incur increased time and costs.

It would be desirable to employ a molding technique for memory card packages that allow the respective profile of each memory card device to be created during molding rather than after molding. After molding, it would be desirable to be able to sever individual memory cards from the molded array by simply punching each memory card out from the array without the need for conventional dicing and its attendant disadvantages.

SUMMARY OF THE INVENTION

It is therefore an object of the invention to provide a molding apparatus for memory card devices that would avoid some of the aforesaid disadvantages of prior art manufacturing processes.

Accordingly, the invention provides a molding system for molding memory card devices, comprising: a molding plate configured to receive a substrate comprising a plurality of individual carriers each of which is pre-cut into a shape of a memory card device and connected to a frame of the substrate by narrow tie bars; a cavity plate configured to be clamped to the molding plate, the cavity plate further comprising a plurality of molding cavities each constructed in the shape of the said carriers, the cavities being operative to create molded packages onto the carrier conforming to a shape of the memory card device without need for further forming of the molded compound after molding; and a nozzle on the surface of each cavity that is operative to introduce molding material into the cavity in a direction that is substantially perpendicular to a plane of the substrate placed on the molding plate.

It will be convenient to hereinafter describe the invention in greater detail by reference to the accompanying drawings, which illustrate one embodiment of the invention. The particularity of the drawings and the related description is not to be understood as superseding the generality of the broad identification of the invention as defined by the claims.

BRIEF DESCRIPTION OF THE DRAWINGS

An example of a preferred embodiment of a molding apparatus in accordance with the invention will now be described with reference to the accompanying drawings, in which:

FIG. 1 (a) and FIG. 1(b) show front and back views respectively of an exemplary memory card;

FIG. 2 is a plan view of a pre-cut substrate array from which individual profiles of each memory card package in the array can be formed during molding;

FIG. 8 is an isometric view of a bottom surface of the middle plate for cooperating with a molding plate to which it is clamped;

FIG. 9 is a plan view of a molding cavity on the middle plate incorporating anti-flash profiles thereon;

FIG. 11 is a side view of a severing apparatus for punching each molded memory card package from an array of molded packages.

DETAILED DESCRIPTION OF THE PREFERRED EMBODIMENT OF THE INVENTION

Figure 3:
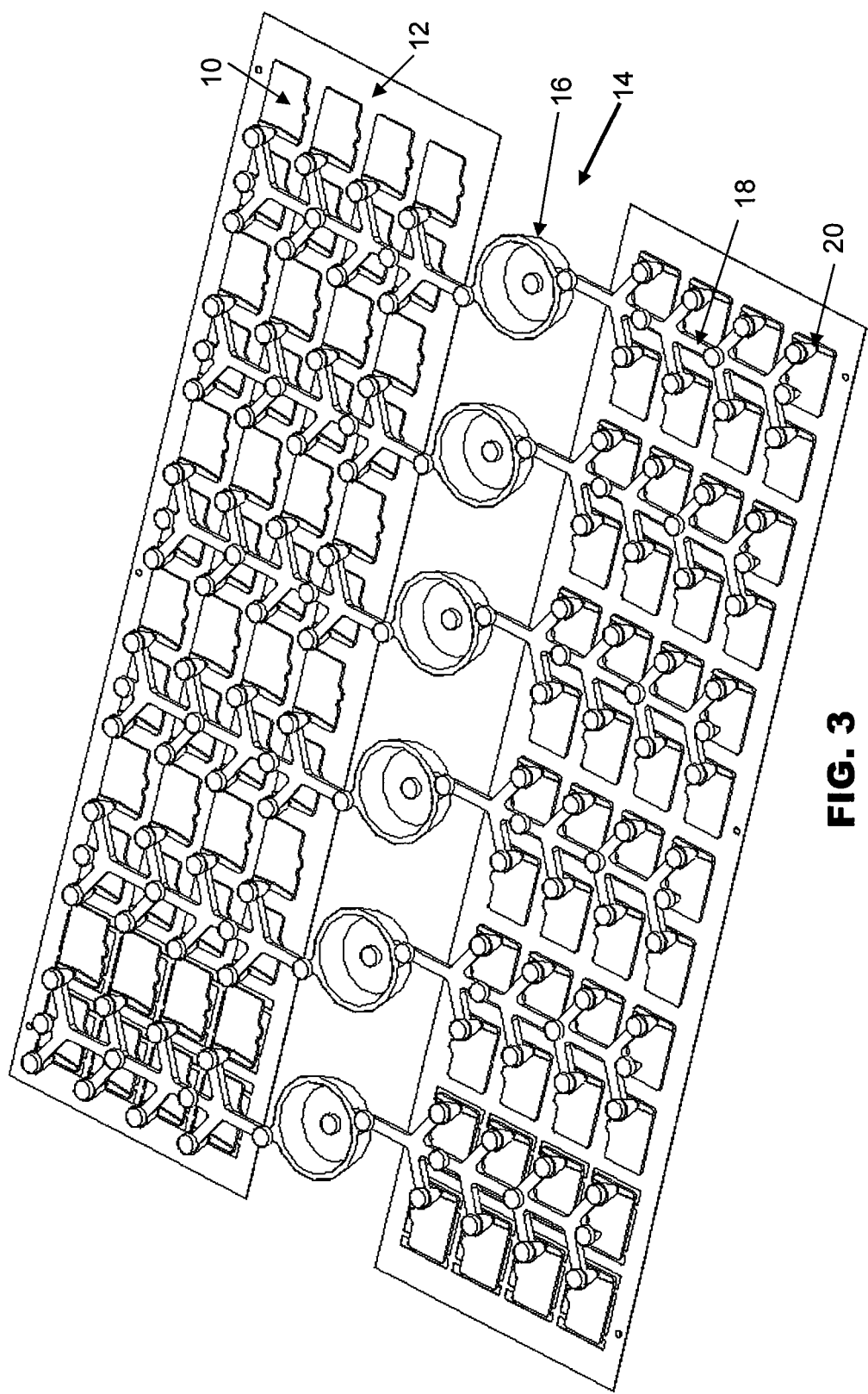
FIG. 3 is an isometric view of a molding layout implemented by a molding apparatus according to the preferred embodiment of the invention.

FIG. 2 is a plan view of a pre-cut substrate array from which individual profiles of each memory card device 10 in the array can be formed during molding. The array comprises multiple rows and columns of memory card devices 10 in matrix form.

The substrate 12 should be pre-cut with any suitable conventional cutting method to cut out the individual carrier pads 15 in the substrate 12 that correspond to the shape of the final memory card end-product. One of the carriers 15 is shown by breaking away a portion of a memory card device 10 mounted on the carrier 15. This cutting process would be less demanding because fragile semiconductor dice have not yet been mounted onto the substrate 12. The preparation ensures that the substrate 12 already has carriers 15 of the desired shape when die-bonding is performed. Semiconductor device are then mounted onto the carriers having the required shape.

It is observed that each carrier 15 is connected to the frame of the substrate 12 by narrow tie-bars 11 only on two sides of the carriers. The minimal connection allows each memory card device 10 to be easily punched out to sever it from the substrate 12 once the memory card devices 10 have been molded. Gaps 13 between each memory card device 10 and the substrate 12 facilitate guiding and positioning of each memory card device 10 for punching, as further explained below.

FIG. 3 is an isometric view of a molding layout implemented by a molding apparatus according to the preferred embodiment of the invention. Arrays of molded memory card devices 10 are formed onto the substrates 12. In the illustration, two substrates 12 are placed together into a single molding apparatus and are molded at the same time.

Since the devices 10 are small in size, molding material 14 is preferably introduced from the top of the devices 10. The molding material 14 comprises a cull portion 16 where a source of molding compound, typically in the form of pellets, is introduced into the molding apparatus. From the cull portion 16, the molding compound is then distributed into a runner portion 18 and subsequently introduced onto each device 10 via a gate portion 20. Each gate portion 20 is situated over a single device 10 such that each device 10 is individually molded into the required shape of the end-product.

Figure 4:
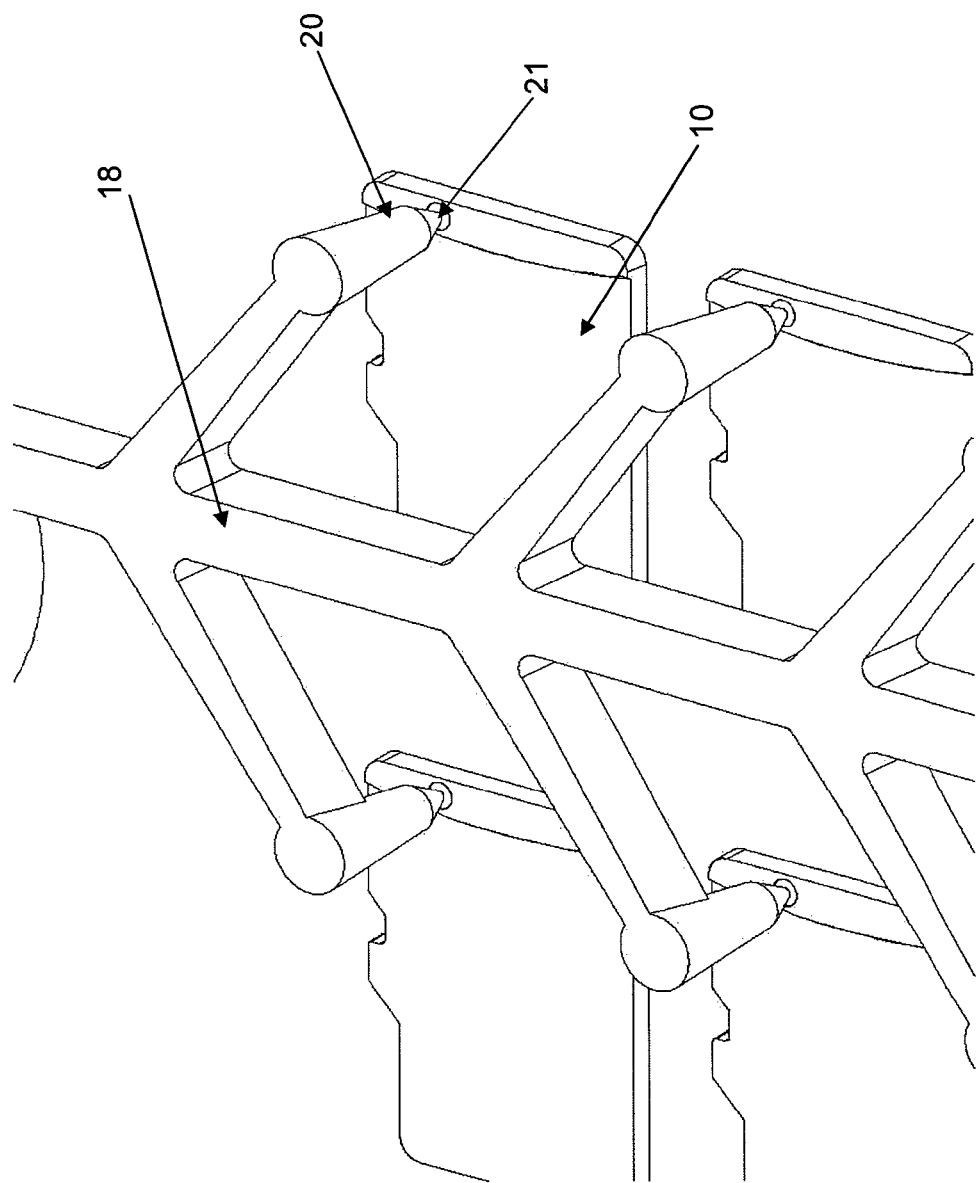
FIG. 4 is a close-up view of a molding gate comprised in the molding layout of FIG. 3.

FIG. 4 is a close-up view of a molding gate 20 comprised in the molding layout of FIG. 3. Molding compound flows from the runner portions 18 to the gate portions 20, and into each molding cavity through small nozzles 21 for molding each device 10. By introducing molding compound from the top of each device 10 through the small nozzles 21 that are operative to introduce molding material into the cavity in a direction that is substantially perpendicular to a plane of the substrate 12, the molding system is able to perform molding with higher density as compared to conventional molding methods wherein molding compound is introduced to molding cavities from the side of the molding cavities.

Figure 5:
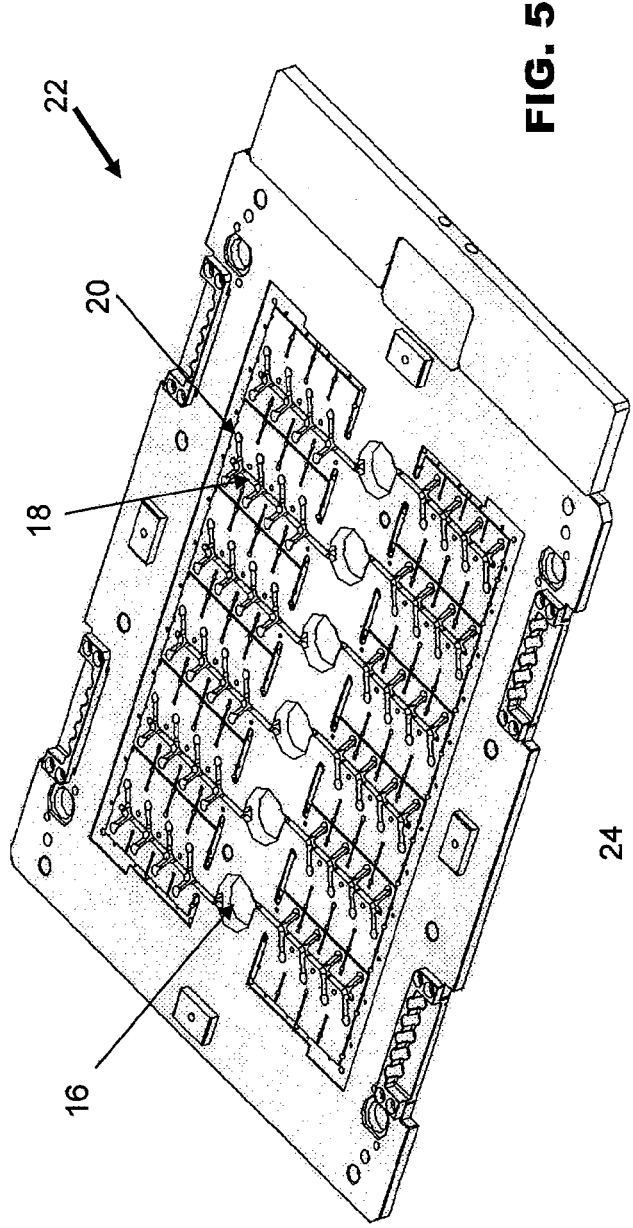
FIG. 5 is an isometric view of a top surface of a middle plate that is clamped between molding plates of a molding apparatus and is used for channeling molding compound into molding cavities.

FIG. 5 is an isometric view of a top surface of a cavity or middle plate 22 that is configured to be clamped between separate molding plates of a molding apparatus and is used for channeling molding compound into the molding cavities, which are preferably arranged in matrix form. A runner system for introducing molding compound into the cavities can be viewed from the top surface of the middle plate 22. As previously explained, molding compound is introduced from the source of molding compound located at the cull portion 16 of the runner system, distributed by the runner portion 18 and enters each molding cavity via the gate portion 20 and nozzles 21 located above each device 10.

Figure 6:
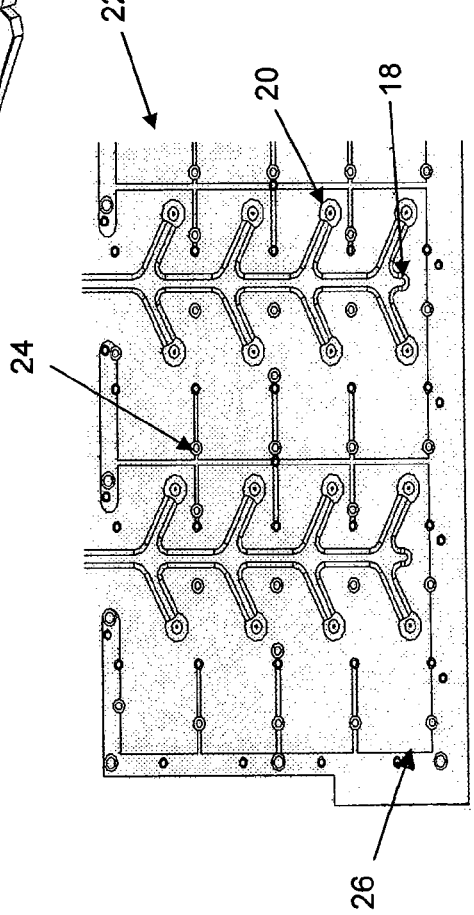
FIG. 6 is a plan view of the middle plate further illustrating vacuum holes and vacuum channels that are comprised therein.

FIG. 6 is a plan view of the middle plate 22 further illustrating vacuum holes 24 and vacuum channels 26 that are comprised therein. The vacuum holes 24 are connected to a vacuum suction apparatus (not shown) and are operative to draw out air from the molding cavities of the molding apparatus. The vacuum channels 26 serve to guide the air drawn from the molding cavities towards the vacuum holes 24 for removal.

Figure 7:
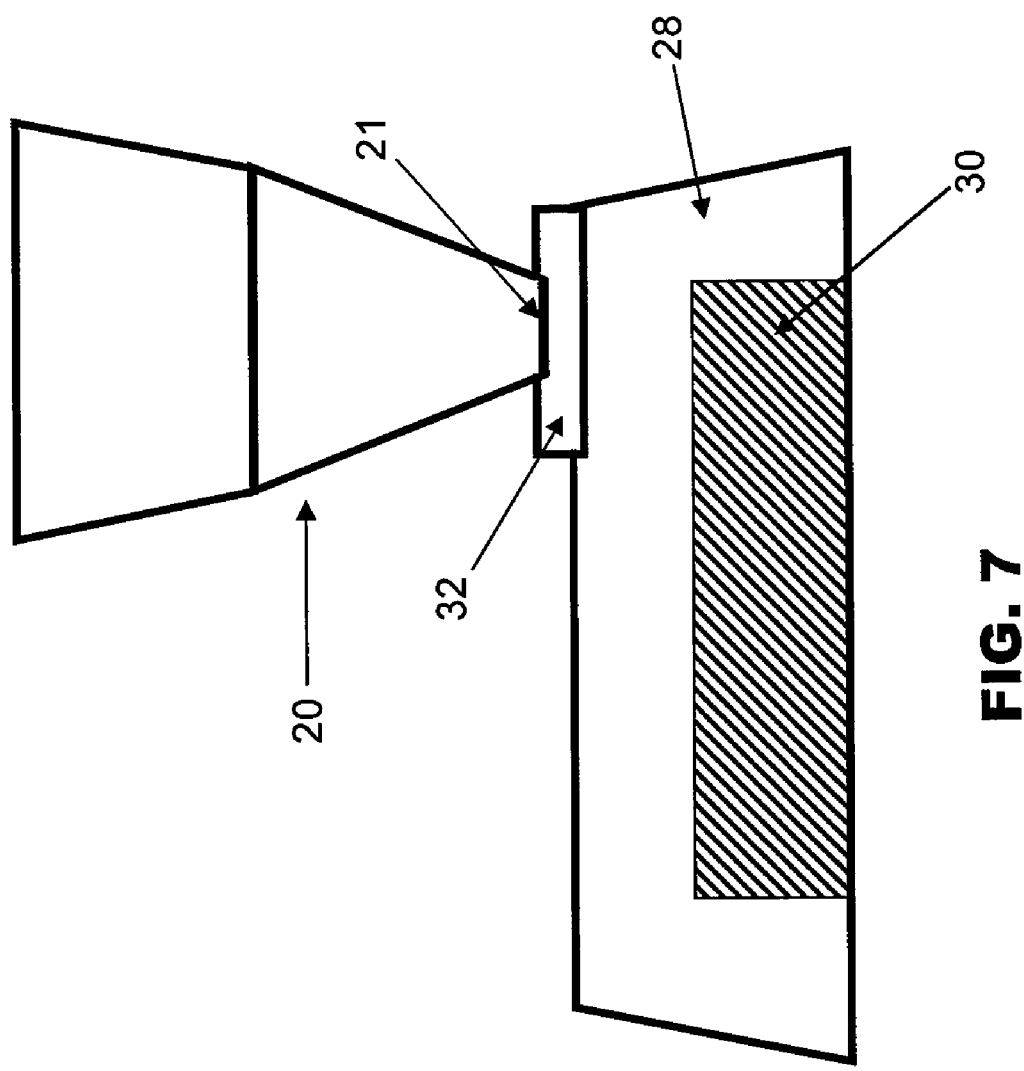
FIG. 7 is a cross-sectional view of a molding cavity which comprises a notch portion.

FIG. 7 is a cross-sectional view of a molding cavity 28 for molding a die 30, the molding cavity 28 further comprising a notch portion 32. The molding compound flows into the gate 20 and enters the molding cavity 28 through a narrow nozzle 21. It is preferred that the molding cavity 28 includes the notch portion 32 to facilitate the smooth flow of molding compound through the nozzle 21 into the molding cavity 28. The profile of the notch portion 32 can also serve ergonomic functions when being handled by an end-consumer. The notch portion 32 extends over a section of the molding cavity 28 and molds a corresponding notch portion onto each molded package. It is also preferred that the gate 20 has a cross-sectional area that gradually decreases in the direction of the nozzle 21.

FIG. 8 is an isometric view of a bottom surface of the middle plate 22 for cooperating with a molding plate to which it is clamped. It shows the arrangement of molding cavities 28 for molding the array of devices 10.

FIG. 9 is a plan view of a molding cavity 28 on the middle plate 22 incorporating anti-flash profiles 34 thereon. The molding cavity 28 is in the final shape that the device 10 is to take in the end-product. The anti-flash profiles 34 are located along and substantially surround a perimeter of the molding cavity 28 to prevent over-flowing of molding compound from the cavity 28. It may comprise a layer of steel. Their function is to prevent mold bleed during molding that would affect the quality of the molded device 10. Excess molded material due to bleed would also necessitate further processing of the device 10 after formation of the molded package to avoid defects. With the anti-flash profiles 34, the molded product corresponds to the final end-product without the need for further severance of excess molded material from the device 10. This is a novel approach as compared to the conventional method of producing memory cards wherein the memory card devices need to be further diced after molding.

The nozzle 21 of the gate 20 is located substantially at an edge of the molding cavity 28 to introduce molding compound into the cavity 28. Further, the nozzle 21 is preferably located at the position of the notch portion 32. Air vent channels 36 situated around the periphery of the cavity 28 are in fluid communication with the vacuum holes 24 to draw air out of the molding cavity 28.

Figure 10:
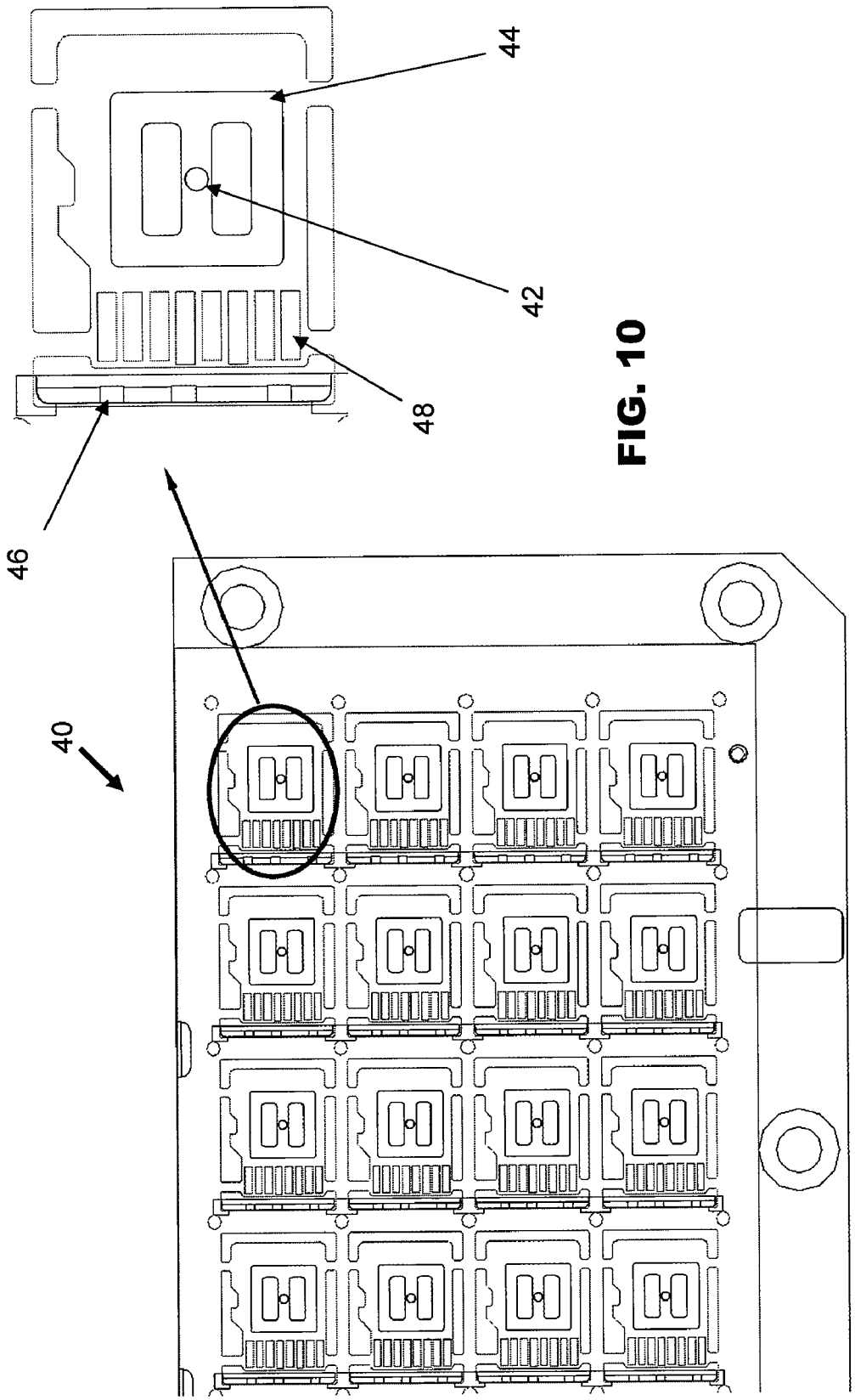
FIG. 10 is a plan view of a molding surface of a molding plate that is configured to be clamped to the bottom surface of the middle plate.

FIG. 10 is a plan view of a molding plate surface 40 of a molding plate that is configured to be clamped to the bottom surface of the middle plate 22, as illustrated in FIG. 8. The molding plate surface 40 comprises a plurality of molding cavities 28. Each molding cavity 28 is constructed in the shape of a carrier 15, and the cavities 28 are operative to create a molded package onto the carrier 15 conforming to the shape of the memory card device without need for further forming of the molded compound after molding, such as in the above-described prior art wherein the molded compound need to be further cut.

The molding plate surface 40 incorporates an array of vacuum suction holes 42, each centrally located in each molding cavity 28, for creating vacuum force to individually hold each device 10 to be molded. Each vacuum suction hole 42 is configured to hold one device 10.

Each vacuum suction hole 42 is further located on recessed vacuum grooves 44 that provide a suction for engaging a main body of each device 10 to be molded. The vacuum grooves 44 comprise a sufficient surface area to provide a vacuum suction area for the device 10 that is held in place during molding against non-recessed parts of the molding plate surface 40. Further, package end vents 46 constructed adjacent one end of each cavity 28 are in communication with the ends of the devices 10 and corresponding air vent channels 36 of the middle plate 22 to draw air away from the molding cavity 28. There are electrical contacts in the form of conductive fingers along one end of the memory card device 10 for communicating with a host device. Pockets 48 corresponding to the shapes of these fingers are used to receive the electrical contacts and to allow the carriers 15 to be arranged flush onto the molding plate surface 40.

As previously mentioned, the molded devices 10 are linked to the substrate 12 by pre-cut tie-bars 11 during preparation of the substrate 12 prior to molding. These tie-bars can easily be severed by a conventional mechanical punching process to separate the molded devices 10 from the substrate 12.

FIG. 11 is a side view of a severing apparatus 50 for punching each molded memory card package 10 from an array of molded packages. The severing apparatus 50 generally comprises positioning pins 52, guiding punches 54, cutting punches 56 and base punches 58. The positioning pins 52 are inserted into corresponding positioning holes formed in the substrate 12 in order to align the substrate 12 relative to the severing apparatus 50. Then, the guiding punches 54 are inserted into gaps 13 adjacent to each device 10 to be severed to align each device 10 to the base punch 58 for severance. The cutting punch 56 will land onto and support the tie-bars 11 and the base punch 58 will rise to push the device 10 upwards, thereby severing the tie-bars 11. The separated device 10 is thereafter supported by the base punch. A pick-head (not shown) will then pick up the severed device 10 from the severing apparatus 50.

The separated memory card devices can be transported immediately for inspection and testing after separation without further need for washing and drying, as required by conventional dicing or cutting techniques.

It is noted that the above processes are most applicable and advantageous for the manufacture of memory card devices that do not use a plastic shed to cover the molded component. Nevertheless, it should be appreciated that the process can be easily modified to include plastic sheds to cover the molded memory devices.

It should be appreciated that instead of using block molding to encapsulate multiple semiconductor dice, each semiconductor die is individually molded into the shape of the end-product which is usable immediately after punching it from the substrate. No wet processes are necessary, and the process is cost-efficient. The molding system is also capable of individually molding a large number of devices in matrix form, which increases efficiency.

Moreover, each of the vacuum suction holes 42 individually holding one device 10 to be molded securely and anti-flash profiles 34 associated with the molding cavities 28 ensure proper control and prevention of mold bleed and flash on the molded substrate.

The invention described herein is susceptible to variations, modifications and/or additions other than those specifically described and it is to be understood that the invention includes all such variations, modifications and/or additions which fall within the spirit and scope of the above description.

The invention claimed is:

1. A molding system for molding memory card devices, comprising:
   a molding plate configured to receive a substrate comprising a plurality of individual carriers each of which is pre-cut into a shape of a memory card device and connected to a frame of the substrate by narrow tie bars on two sides of the carriers, wherein each of the individual carriers are configured to receive an individual memory card device;
   a cavity plate configured to be clamped to the molding plate, the cavity plate further comprising a plurality of molding cavities each constructed in the shape of the said carriers, the cavities being operative to create molded packages onto the carrier conforming to a shape of the memory card device without need for further forming of the molded compound after molding; and
   a nozzle on the surface of each cavity that is operative to introduce molding material into the cavity in a direction that is substantially perpendicular to a plane of the substrate placed on the molding plate.

2. The molding system as claimed in claim 1, further comprising a notch portion over a section of the cavity at the position of the nozzle that molds a corresponding notch portion onto the molded package.

3. The molding system as claimed in claim 2, further comprising a gate portion leading to the nozzle opposite to the notch portion of the cavity, the gate portion having a gradually decreasing cross-sectional area in the direction of the nozzle.

4. The molding system as claimed in claim 1, including anti-flash profiles substantially surrounding a perimeter of each molding cavity to prevent overflowing of molding compound from the cavities.

5. The molding system as claimed in claim 4, wherein each anti-flash profile comprises a layer of steel.

6. The molding system as claimed in claim 1, wherein the cavity plate is underneath a runner system guiding molding compound from a source of molding compound to the nozzles for introduction into the molding cavities.

7. The molding system as claimed in claim 6, including vacuum holes in the cavity plate that are operative to remove air from the molding cavities.

8. The molding system as claimed in claim 7, including vacuum channels in the cavity plate to guide air to be drawn from the molding cavities towards the vacuum holes for removal from the molding system.

9. The molding system as claimed in claim 7, further comprising air vent channels in the molding plate situated at the periphery of each molding cavity and which are in fluid communication with the cavities and vacuum holes for drawing air out of the molding cavities.

10. The molding system as claimed in claim 1, wherein the nozzle is connected to the molding cavity substantially at an edge of the molding cavity.

11. The molding system as claimed in claim 1, further comprising a centrally located vacuum suction hole in each cavity to create vacuum suction force for individually holding by vacuum suction each device to be molded.

12. The molding system as claimed in claim 11, wherein the vacuum suction holes are located on vacuum grooves that provide a suction area for engaging a main body of each device to be molded.

13. The molding system as claimed in claim 1, including a package end vent in the molding plate that is constructed adjacent one end of each cavity for drawing air away from the cavities.

14. The molding system as claimed in claim 1, wherein the plurality of molding cavities is arranged in matrix form.

* * * * *